(12) United States Patent
Keeney et al.

(10) Patent No.: US 7,574,545 B2
(45) Date of Patent: Aug. 11, 2009

(54) METHOD AND APPARATUS FOR CONTROLLING A DOCUMENT OUTPUT DEVICE WITH A CONTROL REQUEST STORED AT A SERVER

(75) Inventors: Richard A. Keeney, Prior Lake, MN (US); Philip A. Lodwick, Richfield, MN (US); Farhad Nourbakhsh, Apple Valley, MN (US); Loren Schoenzeit, Orono, MN (US)

(73) Assignee: Electronics for Imaging, Inc., Foster City, CA (US)

( * ) Notice: Subject to any disclaimer, the term of this patent is extended or adjusted under 35 U.S.C. 154(b) by 1044 days.

(21) Appl. No.: 10/896,336

(22) Filed: Jul. 21, 2004

(65) Prior Publication Data

US 2005/0005047 A1 Jan. 6, 2005

Related U.S. Application Data

(63) Continuation-in-part of application No. 10/753,634, filed on Jan. 7, 2004, now Pat. No. 7,093,046, which is a continuation of application No. 09/688,567, filed on Oct. 16, 2000, now Pat. No. 6,748,471.

(51) Int. Cl.
*G06F 11/00* (2006.01)
(52) U.S. Cl. .................. 710/220; 710/306; 709/203; 358/1.15
(58) Field of Classification Search .............. 710/2, 710/5, 7, 46, 62–64, 300–315; 358/1.15, 358/1.13, 1.16, 1.18; 709/217, 223–224, 709/229–230, 319
See application file for complete search history.

(56) References Cited

U.S. PATENT DOCUMENTS 5,287,194 A 2/1994 Lobiondo (Continued)

FOREIGN PATENT DOCUMENTS

DE 196 41 357 4/1998

(Continued)

OTHER PUBLICATIONS

Web Pages from hpwire.com web site, including white paper entitled "HP Wire: Enabling E-Printing Solutions for the Enterprise," by Lim Chuin Kiat and Wilson Wong (undated), printed from the web site on Jan. 16, 2001 (8 pages total).

(Continued)

*Primary Examiner*—Raymond N Phan
(74) *Attorney, Agent, or Firm*—Michael A. Glenn; Glenn Patent Group

(57) ABSTRACT

The present invention relates to methods and apparatus for controlling a document output device. A control request for controlling the document output device is forwarded from a client device to a server via a network. The control request is stored at the server and communicated to the designated document output device in response to a polling request received via the network from a polling device associated with the designated document output device. Once received, the control request may be carried out at the designated document output device. The control request may include a request for the status of the document output device. The control request may also enable the control of a software function of the document output device, or the updating of firmware and software of the document output device.

45 Claims, 12 Drawing Sheets

U.S. PATENT DOCUMENTS

| | | | |
|---|---|---|---|
| 5,450,571 A | 9/1995 | Rosekrans et al. | |
| 5,559,933 A | 9/1996 | Boswell | |
| 5,625,757 A | 4/1997 | Kageyema | |
| 5,633,932 A | 5/1997 | Davis et al. | |
| 5,721,825 A * | 2/1998 | Lawson et al. | 709/203 |
| 5,727,135 A | 3/1998 | Webb et al. | |
| 5,727,156 A | 3/1998 | Herr-Hoyman | |
| 5,754,747 A * | 5/1998 | Reilly et al. | 358/1.15 |
| 5,799,206 A | 8/1998 | Kitagawa | |
| 5,802,260 A | 9/1998 | Shimakawa | |
| 5,881,213 A | 3/1999 | Shaw et al. | |
| 5,897,236 A | 4/1999 | Hashimoto et al. | |
| 5,898,823 A | 4/1999 | Sorkin | |
| 5,923,834 A | 7/1999 | Thieret et al. | |
| 5,978,560 A | 11/1999 | Tan et al. | |
| 5,982,994 A | 11/1999 | Mori et al. | |
| 5,987,224 A | 11/1999 | Koakutsu et al. | |
| 5,995,723 A | 11/1999 | Sperry | |
| 6,003,069 A | 12/1999 | Cavill | |
| 6,006,281 A | 12/1999 | Edmunds | |
| 6,012,083 A | 1/2000 | Savitzky et al. | |
| 6,023,684 A | 2/2000 | Pearson | |
| 6,043,898 A | 3/2000 | Jacobs | |
| 6,043,909 A | 3/2000 | Holub | |
| 6,094,679 A | 7/2000 | Teng et al. | |
| 6,115,132 A * | 9/2000 | Nakatsuma et al. | 358/1.14 |
| 6,125,372 A | 9/2000 | White | |
| 6,185,613 B1 * | 2/2001 | Lawson et al. | 709/224 |
| 6,240,456 B1 | 5/2001 | Teng et al. | |
| 6,288,790 B1 | 9/2001 | Yellepeddy et al. | |
| 6,298,445 B1 | 10/2001 | Shostack et al. | |
| 6,307,640 B1 | 10/2001 | Motegi | |
| 6,327,045 B1 | 12/2001 | Teng et al. | |
| 6,334,142 B1 | 12/2001 | Newton et al. | |
| 6,337,745 B1 | 1/2002 | Aiello, Jr. et al. | |
| 6,351,317 B1 | 2/2002 | Sasaki et al. | |
| 6,378,070 B1 | 4/2002 | Chan et al. | |
| 6,385,728 B1 | 5/2002 | DeBry | |
| 6,405,178 B1 | 6/2002 | Manchala et al. | |
| 6,449,663 B1 | 9/2002 | Carney et al. | |
| 6,452,691 B1 | 9/2002 | Marshall | |
| 6,466,328 B1 | 10/2002 | Bradley et al. | |
| 6,490,052 B1 * | 12/2002 | Yanagidaira | 358/1.15 |
| 6,615,234 B1 | 9/2003 | Adamske et al. | |
| 6,623,527 B1 | 9/2003 | Hamzy | |
| 6,711,677 B1 | 3/2004 | Wiegley | |
| 6,748,471 B1 | 6/2004 | Keeney et al. | |
| 6,985,243 B1 | 1/2006 | Matsueda | |
| 7,038,046 B2 | 5/2006 | Wagner | |
| 7,095,518 B1 | 8/2006 | Kenney et al. | |
| 7,343,438 B2 | 3/2008 | Keeney et al. | |
| 2001/0037462 A1 | 11/2001 | Bengtson | |
| 2002/0145748 A1 | 10/2002 | Nonoyama et al. | |
| 2003/0086110 A1 | 5/2003 | Parry | |

FOREIGN PATENT DOCUMENTS

| | | |
|---|---|---|
| EP | 0 598 513 | 5/1994 |
| EP | 0 872 792 A2 | 10/1998 |
| EP | 0 910 203 | 4/1999 |
| EP | 0 952 513 | 10/1999 |
| EP | 0 974 890 A2 | 1/2000 |
| EP | 0 974 892 | 1/2000 |
| EP | 0 977 113 A2 | 2/2000 |
| EP | 0 991 227 A2 | 4/2000 |
| EP | 1 026 576 | 8/2000 |
| JP | 2000-155733 | 6/2000 |
| WO | WO 98/51054 | 11/1998 |

OTHER PUBLICATIONS

PrinterOn Corporation Products and Solutions white paper, by Patrick Pidduck, Jul. 27, 2000 (13 pages).

Web page from kinkos.com web site, printed from the web site on Jan. 16, 2001 (1 page).

Web pages from weborder.kinkos.com web site, printed from the web site on Jan. 16, 2001 (4 pages).

PCT/US2005/024727 Int'l Search Report & Written Opinion in Related WO Case, Nov. 10, 2005, Keeney et al.

PCT/US2005/024727 Int'l Prelim Exam Report in Related WO Case, Feb. 1, 2007, Keeney et al.

* cited by examiner

METHOD AND APPARATUS FOR CONTROLLING A DOCUMENT OUTPUT DEVICE WITH A CONTROL REQUEST STORED AT A SERVER

This application is a continuation-in-part of, commonly assigned U.S. patent application Ser. No. 10/753,634 filed on Jan. 7, 2004, which was a continuation of, commonly assigned U.S. patent application Ser. No. 09/688,567 filed on Oct. 16, 2000, now U.S. Pat. No. 6,748,471 issued on Jun. 8, 2004.

BACKGROUND OF THE INVENTION

The present invention relates to methods and apparatus for remotely controlling a document output device, such as a printer, a copier, a facsimile machine, or a multifunction printer/fax/copier machine over a communications network. Such control may include requesting and receiving the status of a document output device or controlling a software function of the document output device. Firmware and software updates may also be provided to a document output device in accordance with the present invention.

It is well known to obtain status reports from copiers (e.g., a copy count) remotely over the Internet, a cellular telephone network, and/or a paging network. Various devices may be installed in the copier to determine the number of copies made by the copier. This copy count may then be periodically sent from the copier over the Internet, cellular or paging networks to a remote location, such as the entity leasing or servicing the copier.

It would be advantageous to provide a simple and efficient control mechanism for a document output device, which includes the capability to transmit device status, control software functions, and allow for software or firmware upgrades. In addition to the need for efficiency and ease of use is the need for security when remotely controlling printers, fax machines and copiers which are connected to a network.

Early in the life of the Internet, the need for securing an organization's local network from tampering, stealing, or vandalism by outsiders became very obvious. A type of gateway called a firewall was developed to meet this need. The firewall is designed to be a single, well-controlled access point between the outside, global, or wide-area network and the inside, local-area network. By carefully restricting the types of network traffic and the destinations where that traffic can flow, the firewall can provide effective protection.

Specific "holes" in the firewall are created for each type of traffic that is allowed through the gateway in each direction. Most organizations, for example, allow e-mail traffic in and out from their e-mail server, as well as web page client access from inside the firewall to servers located outside of it.

Many types of access between machines commonly used on a local network are normally prevented from going through the firewall. Specifically, file sharing, remote log-in, printing, and various other network-administration types of protocols are typically not allowed to be transported outside the firewall.

Another aspect of the firewall is that it is almost always administratively controlled by a centralized authority for the organization that owns the local area network—commonly the management information services (MIS) department of a company. Normal users generally have to make special requests that are approved at the upper levels of management to get configuration changes in the firewall. In the interest of maintaining security, these changes are often limited to specific point-to-point exceptions or "holes" in the firewall.

It is desirable by many to be able to send control requests from a machine (client device) on one local area network to a document output device located on a different local area network with the data being transferred over a global network (e.g., the Internet) outside of the firewall of both local networks.

The current mechanisms for remotely obtaining the status of a copier does provide solutions for this problem. However, almost all of these solutions require the intervention of the firewall administrator.

It would be further advantageous to have a solution that allows secure, efficient and easy-to-configure inter-network control of a document output device through a gateway firewall without the intervention of the network administrator.

The methods and apparatus of the present invention provide the foregoing and other advantages.

SUMMARY OF THE INVENTION

The present invention provides methods and apparatus for controlling a document output device. In an example embodiment of the invention, a control request for controlling a designated document output device is forwarded from a client device to a server via a network. The control request is stored at the server and communicated to the designated document output device in response to a polling request received via the network from a polling device associated with the designated document output device. Once received, the control request may be carried out at the designated document output device.

The polling device may include a transmitter for forwarding a polling request to the server over a network and a receiver for receiving the control request from the server at the polling device in response to the polling request. The polling device may also include an interface with the designated document output device for communicating the control request to the designated document output device.

The document output device may comprise at least one of a printer, a copier, a facsimile machine, or the like. The document output device may also be a multifunction machine with printing, faxing, and/or copying capabilities.

The control request may comprise a request for a status report from the designated document output device. The requested status report may be provided from the designated document output device to the server upon receipt of the control request. The status report may be downloaded from the server via at least one of the client device, a telephone, a computer, an Internet appliance, a personal digital assistant, or any other device capable of communicating with the server over the communication network.

The request for a status report may comprise at least one of a request for a count of pages copied, a request for a count of pages printed, a request for a toner level, a request for drum usage, a request for a paper supply level, a request for error information, a request for an on-line or off-line indication, a request for a device ready indication, a request for a paper jam indication, a request for a media mismatch indication, or any other status indication which may be obtained from the document output device.

The status report may also include vendor contact information to facilitate obtaining supplies or service for the designated document output device. Automatic on-line ordering of supplies for the designated document output device may be provided for in response to the status report.

In an alternate embodiment of the present invention, the control request may comprise a request to manipulate a software controlled function of the designated document output device. For example, the software controlled function may comprise adjusting offsets, adjusting timings, raising temperature of fuser oil, adjusting imageable area, configuring installed media, or the like. Alternatively, the control request may comprise a firmware or software update for the designated document output device.

The polling request may be periodically forwarded from the polling device to the server. For example, the polling request may be forwarded on an hourly, daily, or weekly basis. The period of the polling may be configured using a control request.

The network may comprise at least one of a local area network, a wide area network, a global network, a telephone network, and the Internet. The polling device may be located within a gateway firewall, while the server may be located outside the gateway firewall. In such an embodiment, the control request may be forwarded to the server as web-style traffic and received at the polling device as web-style traffic. Ideally, the control request is forwarded by the server to the polling device such that reconfiguration of the gateway firewall is not required.

In a further example embodiment of the present invention, the client device may be located at and in communication with a first local area network. The polling device may be located at and in communication with a second local area network. The server may be located outside of the first and second local area networks. The client device may communicate with the server via a first gateway firewall which controls access to the first local area network. The polling device may communicate with the server via a second gateway firewall which controls access to the second local area network.

The polling device may be one of (i) a stand-alone device connected to the document output device via one of a USB port or a bi-directional parallel port, (ii) integrated into the firmware of the document output device, or (iii) integrated into the software of a local network server.

The polling device may be provided with a unique identifier. The control request may be associated with a designated document output device according to the unique identifier of the polling device. The control request may be stored at the server in accordance with the unique identifier. The unique identifier of the polling device may comprise one of a media access ID, an IP address, a telephone number, a serial number of the polling device, a serial number of the document output device associated with the polling device, a vendor supplied identification, or the like.

The client device may comprise one of a telephone, a computer, an Internet appliance, a personal digital assistant device, a dedicated terminal, or the like.

In an alternative example embodiment of the present invention, the polling device may be associated with more than one document output device. For example, the polling device may be associated with a plurality of document output devices in a local area network. In such an example embodiment, the polling device may poll the server for any control requests stored thereat for any of the document output devices in the local area network, each of which may have a unique identifier as discussed above. The polling device may then receive the control requests from the server and route them to the appropriate document output device according to the unique identifier.

BRIEF DESCRIPTION OF THE DRAWINGS

The present invention will hereinafter be described in conjunction with the appended drawing figures, wherein like reference numerals denote like elements, and.

DETAILED DESCRIPTION OF THE INVENTION

The present invention enables information to be requested and received from a spooling server at a document output device, such as a printer, a facsimile machine, a copy machine, a multifunction machine, or the like. For example, information, such as print jobs or control requests, can be delivered to and stored on the spooling server and subsequently delivered to one or more document output devices, on request, via a polling device. The polling device uses "pull" technology, which polls the spooling server for information associated with the document output device so that the spooling server does not have to initiate a connection into the document output device. In this manner print jobs can be securely printed anywhere, either automatically or at the request of a user who is authorized by the polling device and/or the spooling server. Further, a document output device may be remotely controlled from a client device in a secure manner by sending a control request to the server for a particular document output device. Since the spooling server need not initiate contact with any device, there is no potential breach of firewall security in a local network environment.

In one embodiment, a portable polling device is provided to enable retrieval of information from any location having Internet access and a printer. The spooling server functions as a repository that is accessible, e.g., via a global communication network such as the Internet, to authorized users at any time of day. Since the polling device polls the spooling server in order to obtain delivery of the information stored on the spooling server, prior art push data flow techniques, which could compromise a local area network's security, are avoided. Moreover, compatibility with virtually all document output devices that may be connected to the network is provided, so that information can be sent anywhere regardless of a specific device's requirements. Many other advantages and features of the invention are set forth in the following description.

Figure 1:
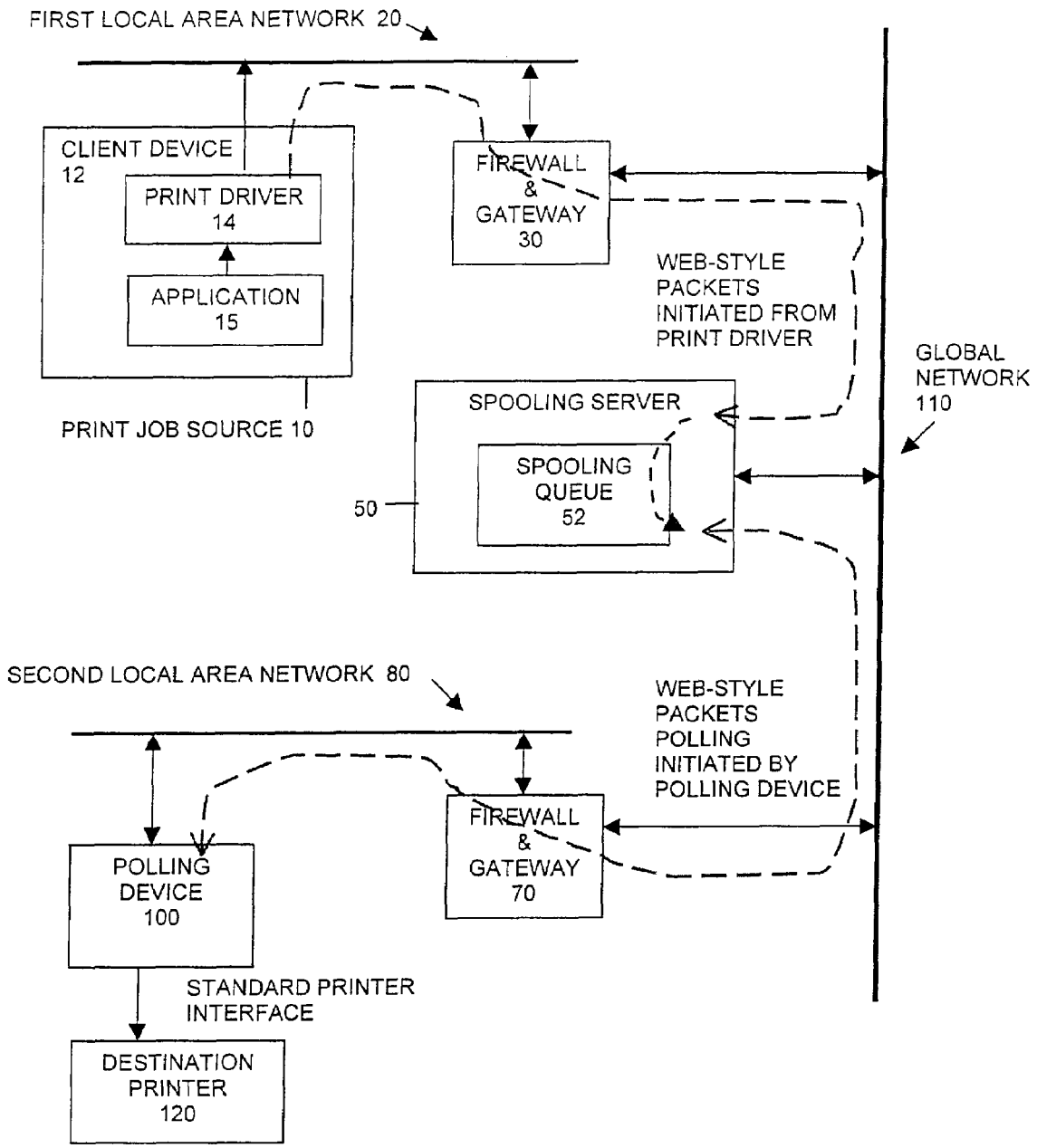
FIG. 1 is a block diagram of an example embodiment of the present invention.

A preferred embodiment of the invention is shown in FIG. 1. Printing services are provided via a spooling server 50 which is capable of receiving and storing one or more print jobs from a print job source 10 via a network 110. A polling device 100 is provided which is capable of polling the spooling server 50 via the network 110 to identify a print job associated with the polling device 100. Configuration problems are eliminated as each print job source 10 only needs to be configured to know how to print to the spooling server 50. The spooling server 50 only needs to be configured to be able to print to the polling device 100.

The print job can originate from any suitable print job source 10. As shown in FIG. 1, the print job source 10 may be a client device 12 associated with print driver 14. The print driver 14 may receive the print job from an originating application 15, which can be any program capable of producing a printable document. The print job source 10 may also be a web browser, a facsimile machine, a scanner, a telephone, an Internet appliance, a personal digital assistant, or the like. A print job can also originate on the spooling server 50 itself or be obtained from another server. The client device 12 may be a computer, a telephone, a personal digital assistant, an Internet appliance, a facsimile machine, a scanner, or the like.

The identified print job can be transmitted from the spooling server 50 to the polling device 100 and printed at a printer 120 coupled to the polling device 100. Printer 120 may be a single printer or a pool of one or more printers coupled via a print server.

The polling device 100 may periodically poll the spooling server 50 to identify a print job associated with the polling device 100. Security is achieved by the fact that the printer 120 is not passively accepting any and all connections from the outside. The polling device 100 is initiating connections to a specific, trusted location, the spooling server 50.

The network 110 may comprise at least one of a local area network, a wide area network, a global network, the Internet, and any other type of network. The network 110 may consist of multiple interconnected networks having multiple gateways and other features as is well known in the art.

In an alternate embodiment, the polling device 100 may be located within a gateway firewall 70 and the spooling server may be located outside the gateway firewall 70. In addition, the print job source 10 may be located within a gateway firewall 30 and the spooling server may be located outside the gateway firewall 30.

The print job may be forwarded to and from the spooling server 50 such that reconfiguration of gateway firewalls 30 and 70 is not required. For example, the print-job may be forwarded to the spooling server 50 as web-style traffic and received at the polling device 100 as web-style traffic. For example, a print driver 14 may accept print requests from application 15 like any other print driver, but instead of routing the print requests onto the network 110 using normal printer packets and well-known-ports, it routes the output of the print job to the spooling server 50 located outside of the firewall 30 using packets and ports that resemble web traffic.

Similarly, using web types of packets and ports, the polling device 100 is capable of polling the spooling server 50 and retrieving any print jobs that have been stored for the printer 120.

As shown in FIG. 1, the print job source 10 may be located at and in communication with a first local area network 20 and the polling device 100 may be located at and in communication with a second local area network 80. The spooling server 50 may be located outside of the first and second local area networks 20, 80. The print job source 10 may communicate with the spooling server 50 via a first gateway firewall 30 which controls access to the first local area network 20 and the polling device 100 may communicate with the spooling server 50 via a second gateway firewall 70 which controls access to the second local area network 80.

The polling device 100 may be: (i) a stand-alone device connected to the printer 120 via a standard printer port, (ii) integrated into the firmware of the printer 120, (iii) integrated into the software of a network print server, or (iv) of any other suitable configuration. The polling function may also be integrated into the software on a stand-alone print server such as those manufactured by Electronics for Imaging, Inc. (Foster City, Calif.) under the trademarks Fiery® and EDOX®.

In a preferred embodiment, a fee may be charged to access the spooling server 50. The fee can be based on one of print job size in bytes, print job size in number of pages, print job type, time for printing, time for storage, monthly fee, per use fee, lifetime membership, monthly membership, use of color, use of black and white, page size, location, convenience, number of images, print quality, image quality, or other suitable factors. The fee may be charged for providing a print job to the spooling server 50 and/or retrieving a print job from the spooling server 50. The fee can be paid via a client device 12 associated with the print job source 10, the polling device 100, or any other suitable device capable of communicating with the spooling server, such as a smart card, a telephone, a personal digital assistant, or the like.

The spooling server 50 may store the one or more print job(s) in at least one spooling queue 52. The spooling server 50 may be maintained by a trusted party on the outside of the firewalls 30, 70. Alternatively, the spooling server 50 may be owned and maintained by the organizations desiring to utilize inter-network printing.

Since the communications amongst the print job source 10, the spooling server 50, and the polling device 100 may travel across public networks, it is very desirable to protect any proprietary or confidential information that may be embodied in the print jobs.

In a preferred embodiment, the print job may be encrypted at the print job source 10 and decrypted at the polling device 100. For example, the print job can be encrypted on the client device 12 such that it can only be printed by a person with the correct decryption key. In addition, printing of the document can be delayed until the key is physically entered at the polling device 100 (e.g., the recipient is physically present at the printer 120).

Figure 2:
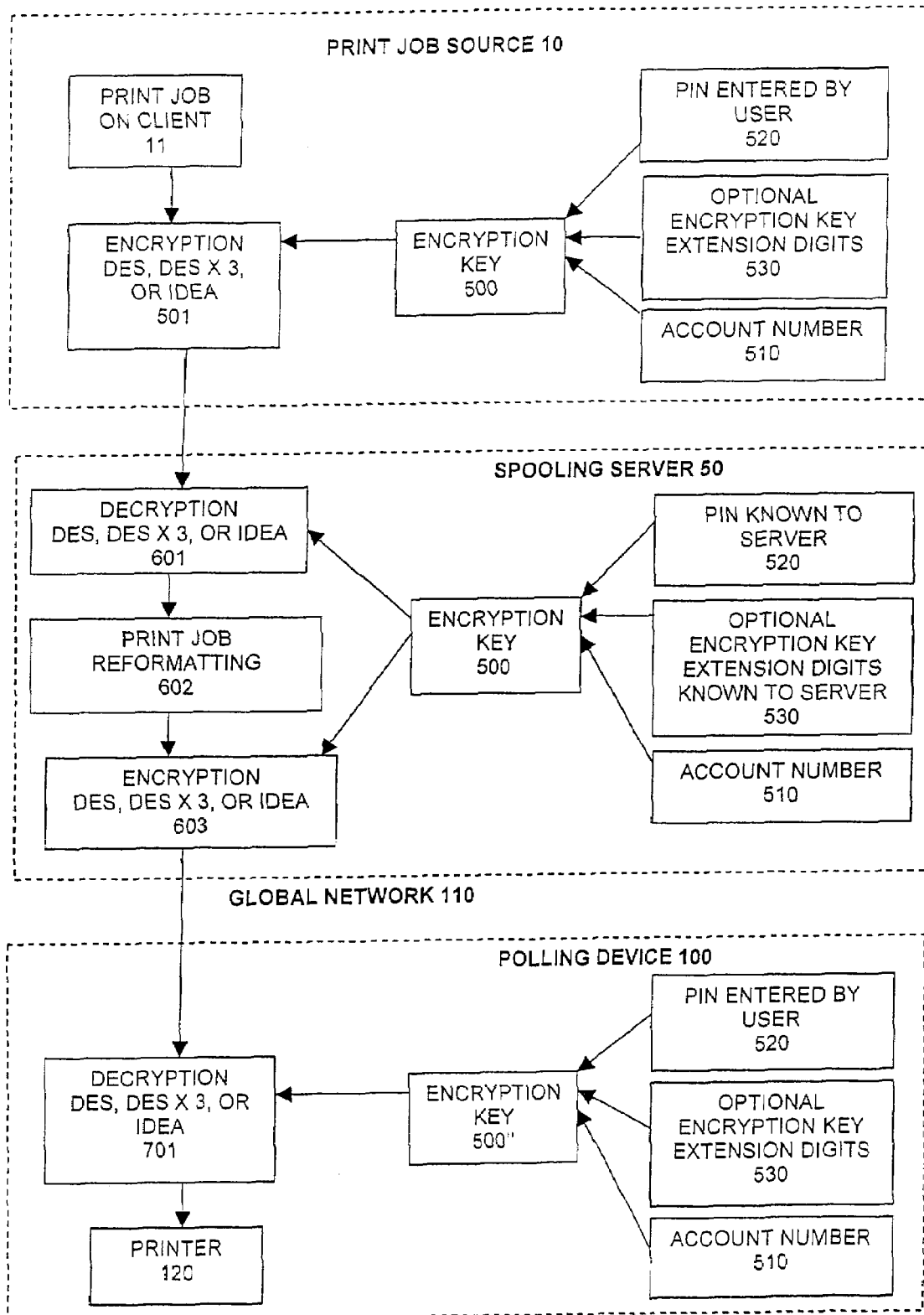
FIG. 2 is a flow diagram showing an example encryption process in accordance with the invention.

A flow diagram of an example of an encryption process used between the print job source 10, the spooling server 50 and the polling device 100 is shown in FIG. 2. The print job 11 is protected by encrypting the print job (indicated at 501) at the print job source 10 (e.g., on the print driver 14 or an agent program on the originating client device 12 of FIG. 1) and decrypting it at the spooling server 50. The encryption algorithm may be the IDEA algorithm. Other suitable encryption algorithms which can be utilized are DES (the Data Encryption Standard), or triple-DES (DES applied to the data three times with three different keys). Other encryption algorithms suitable for commercial confidential information are numerous and well known in the art of data encryption.

The key 500 used for encryption 501 may be derived from an account number 510, a user's secret PIN (personal identification number) 520, and/or optionally some additional encryption key digits 530 supplied by the user. Simply concatenating the bits together from these sources provides a moderately secure key 500. Optionally, additional security may be achieved by using a more sophisticated hashing function.

The key 500 would be known only to the user and to the secure, trusted, spooling web server 50. The encrypted print job is sent to the spooling server 50 where it is decrypted (601) to facilitate reformatting 602 for the destination printer once it is known. The reformatted print job data is re-encrypted 603 using the same or similar key 500' derived in the same manner as key 500 at the print job source 10. The encrypted print job is then transmitted from the spooling server 50 to the polling device 100. Once at the polling device 100, the print job is decrypted 701 using a key 500" derived from the PIN 520, account number 510, and/or optional encryption key extension digits 530. The decrypted print job can then be forwarded to the printer 120 for printing.

The print job 11 may comprise a document provided by a content provider. The content provider may be one of a newspaper, a magazine, a periodical, a document provider, a graphic arts provider, a notification service, an Internet content provider, a merchant, a financial institution, a government agency, a shipping company, or the like. For example, instead of physically delivering the daily sports page, it is simply printed on a customer's home printer.

The print job 11 may be provided by the content provider on a subscription basis. A single print job may be provided by the content provider for printing by multiple users.

Figure 3:
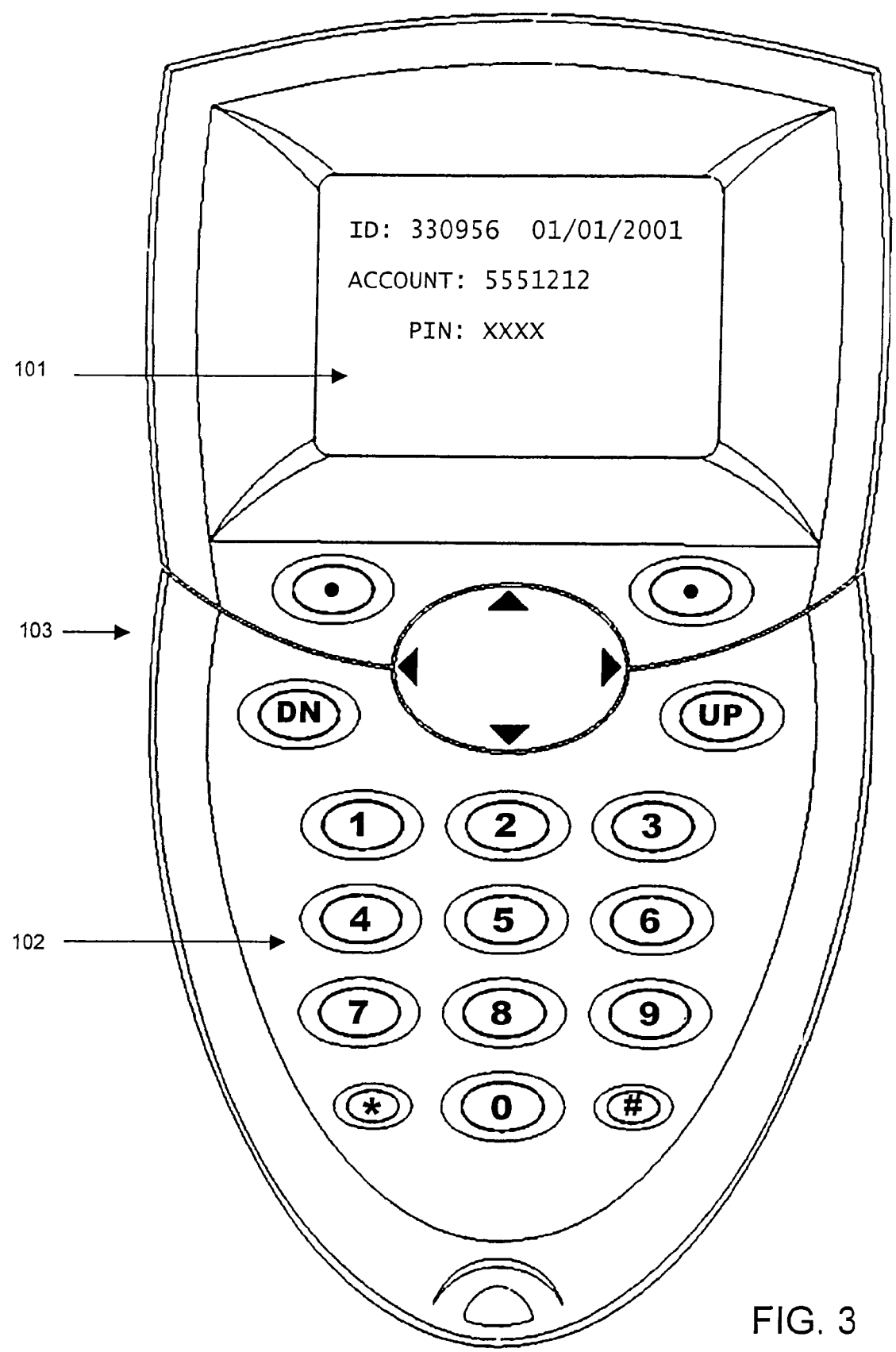
FIG. 3 shows a representation of a polling device.

The polling device 100 may comprise a user interface, a connection to the network 110, and a connection to the printer 120. FIG. 3 shows an embodiment of a user interface 103 for the polling device 100 having a display 101 and a keypad 102. The keypad 102 shown in FIG. 3 may also comprise an alphanumeric keypad to allow for entry of both letters and numbers. The user interface may optionally include a speaker and a microphone for audio output and input, and may also include a card reader for reading a magnetic strip on a credit or debit card, automated teller machine (ATM) card, smartcard, prepaid print card, or the like.

Figure 4:
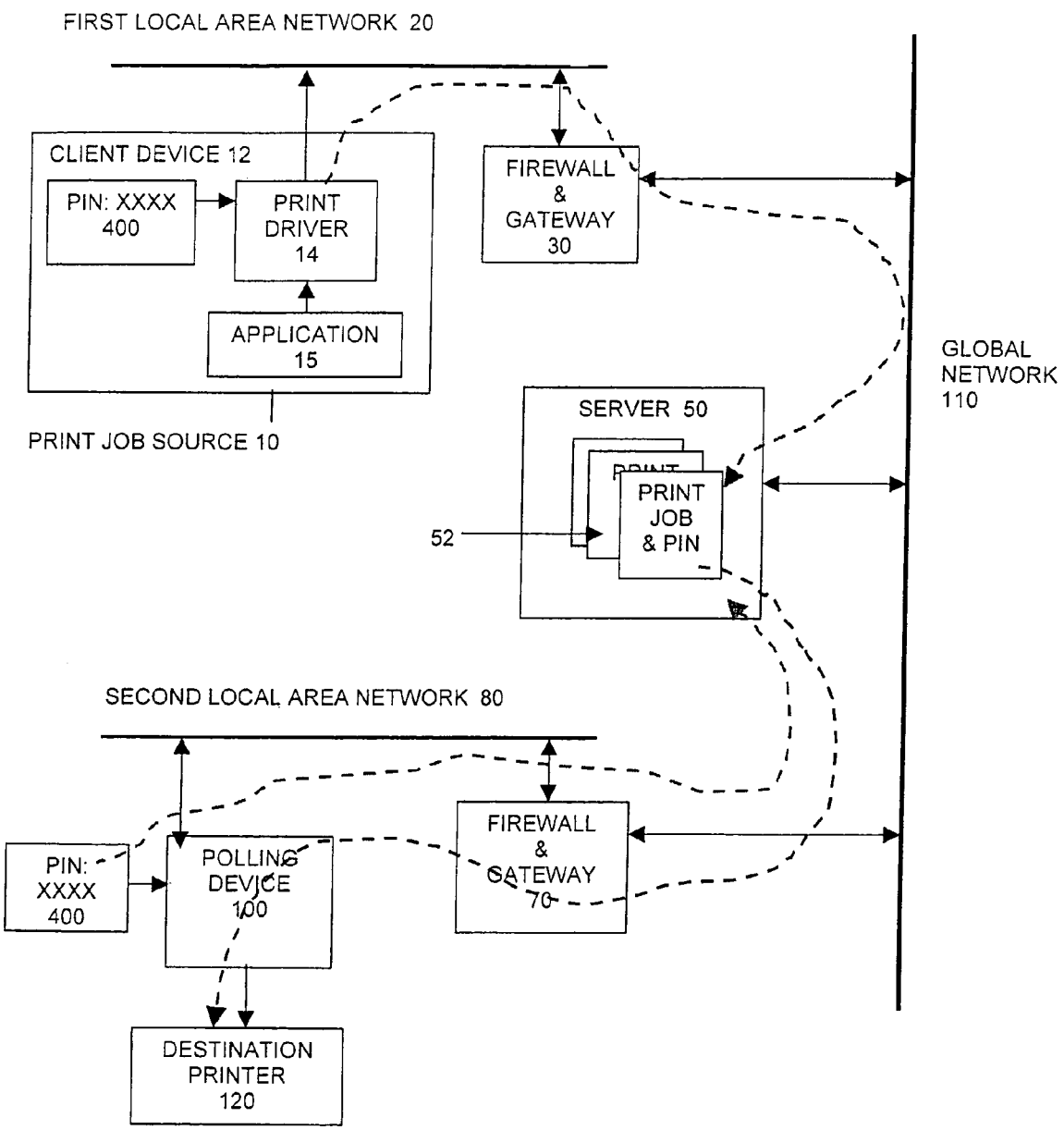
FIG. 4 is a block diagram of an alternate embodiment of the invention.

In a further embodiment as shown in FIG. 4, each print job may be stored on the spooling server 50 according to a personal identification number (PIN) 400. As an example, FIG. 4 shows the PIN 400 entered at a client device 12. The PIN 400 is forwarded to the spooling server 50 by the print driver 14 along with the print job. The spooling server 50 may communicate to the polling device 100 a list of print jobs associated with the PIN 400 which are stored at the spooling server 50. The selection of a print job from the list may be provided for (e.g., via a user interface). For example, a small terminal may be provided at each polling device 100 to allow a user to interact with the spooling server 50 and request that the user's print jobs be sent to the printer 120 at the user's location. The user may identify himself or herself at the polling device 100 with their PIN 400, and the spooling server 50 can then match that PIN 400 with print jobs previously submitted using that same PIN 400.

A plurality of print jobs may be stored on the spooling server 50 according to the PIN 400 (e.g., in spooling queue 52). For example, a directory may be created for each user, and thus each PIN, registered with the spooling server 50. Each print job may additionally be assigned a unique job number at the time it is first received at the spooling server 50. Thereafter, the job number may be used to access the data files associated with that job unambiguously. Once a print job has been selected to be printed to a destination printer 120, the job number for the print job may be entered into a queue associated with the destination printer 120. Data structures suitable for maintaining a queue are well known in the art. In the preferred embodiment, the queue 52 is maintained in a C++ class known as a CList provided by Microsoft in their C++ class library.

When the polling device 100 polls the spooling server 50, the spooling server 50 checks to see if the queue for that printer 120 contains any print jobs. When the spooling server 50 finds a print job waiting to be printed, the data for that print job is retrieved from the file system, reformatted in a form suitable for the identified printer 120, and transmitted to the polling device 100.

The PIN 400 may be provided to the spooling server 50 via one of a user interface associated with the polling device 100, a telephone, a computer, an Internet appliance, a facsimile machine, a scanner, a personal digital assistant device, a dedicated terminal, or the like. The list of available print jobs may be displayed on one of a user interface associated with the polling device 100, a telephone, a computer, an Internet appliance, a facsimile machine, a scanner, a personal digital assistant device, a dedicated terminal, or the like. Selection of an available print job may be made via a user interface associated with the polling device 100, a telephone, a computer, an Internet appliance, a facsimile machine, a scanner, a personal digital assistant device, a dedicated terminal, or the like.

Figure 5:
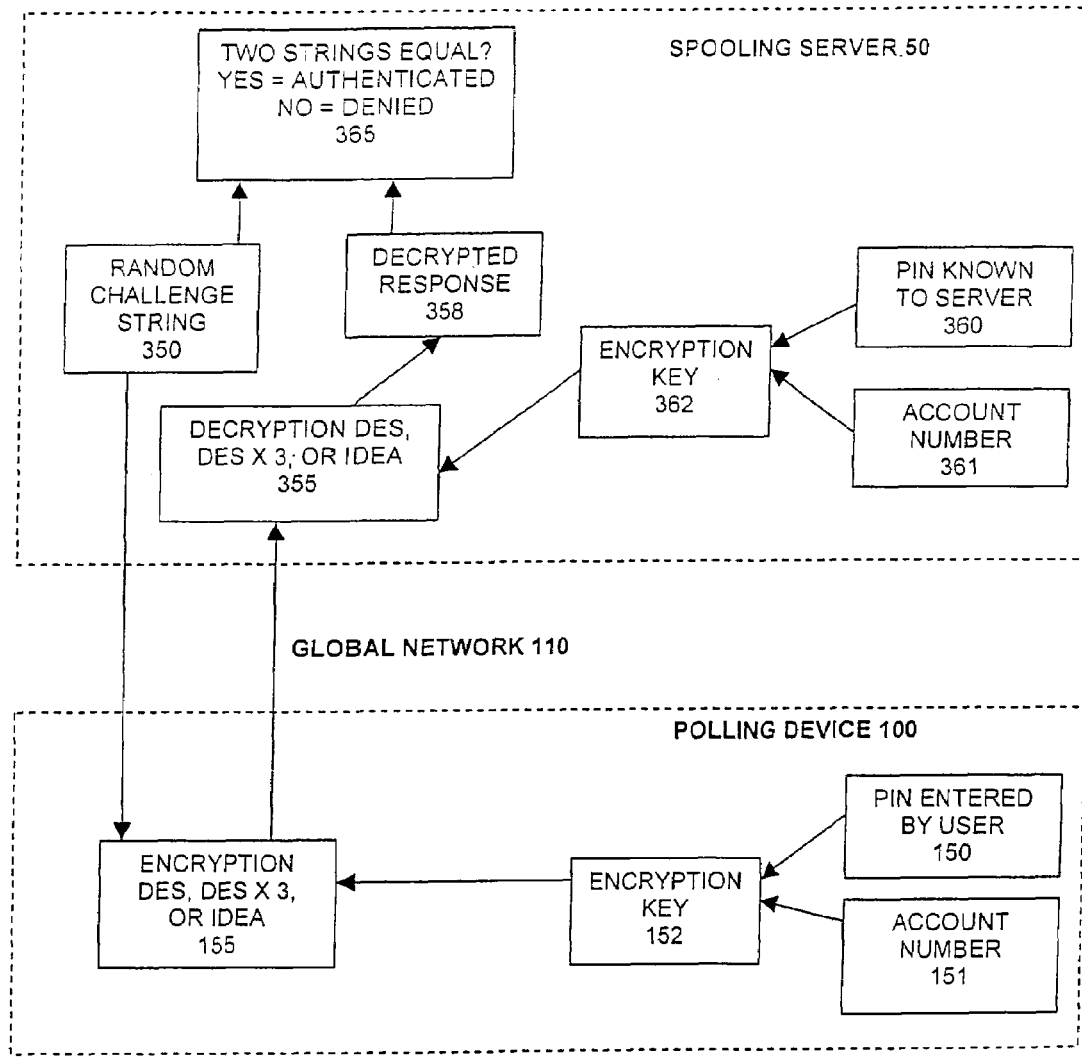
FIG. 5 is a flow diagram of an example embodiment of an authentication procedure in accordance with the invention.

FIG. 5 illustrates an exemplary process of authentication of a user using a PIN. When a user desires to access their account or documents over a non-secure channel, first, the spooling server 50 needs to verify that it is indeed talking to the actual user. The server generates a random string of bits 350. These bits are sent to the polling device 100 where authentication is to take place. The user's PIN 150 is used to generate an encryption key 152 for encrypting the bits (indicated at 155) and the result is returned to the spooling server 50. The spooling server 50 decrypts the string (indicated at 355) using an encryption key 362 generated from the PIN it knows (360) and compares it to the original random string (indicated at 365). If the decrypted string 358 matches the original string 350, the spooling server 50 accepts the user as authenticated. An account number (361, 151) may optionally be used (either alone or in connection with the PIN) to generate the encryption keys 362, 152. Many other authentication protocols are well known in the art and may be substituted for the protocol described above in connection with FIG. 5.

The polling device 100 may be a portable device. The polling device 100 may be operably associated with a variety of printer types.

In a further embodiment, the print job may be provided to the spooling server 50 without a pre-determined print destination. A user is able to interact with the polling device 100 and communicate the identification of the desired print destination for the user's print job to the spooling server 50. The user need not know anything more about the printer 120 than its location (which the user needs anyway to be able to retrieve the physical output pages).

Alternatively, a desired print location for the print job may be designated at the print job source 10. The designated print location may be communicated to the spooling server 50 with the print job. The print job may be printed at the desired print location when the polling device 100 at the desired print location polls the spooling server 50 and identifies the print job.

Further, a substantially specific time for printing a print job may be designated such that the print job is only available for printing from the spooling server 50 at the designated substantially specific time.

In addition, a lifetime of the print job may be designated, wherein the print job will be stored on the spooling server 50 only for the designated lifetime.

A number of printings of the print job may be designated, wherein the print job can only be printed from the spooling server 50 the designated number of times.

A list of recipients authorized to retrieve a print job may be designated, wherein the print job may only be printed by the designated recipients. For example, a document or series of documents may be provided to the spooling server 50 which document or documents can be received by a designated group of recipients, such as a company's sales force, newsgroup or other content subscribers, or other target audiences.

The print job may be one of a negotiable instrument, a stamp, a coupon, a certificate, a check, a unit of currency, a token, a receipt, or the like. In such circumstances, it may be desirable that the designated number of printings is one.

The print job source 10 may be connected to the network 110 using Dynamic Host Configuration Protocol (DHCP protocol), or any other suitable network configuration protocol. Similarly, the polling device 100 may be connected to the network 110 using DHCP protocol, or any other suitable network configuration protocol.

DHCP is a protocol which allows nodes to be added to a TCP/IP network dynamically without specific prior configuration of that node in the domain controller's hosts database. Each node desiring to connect announces itself to the DHCP server. The name of the node is sent to the DHCP server. The DHCP server then assigns the node a dynamic IP address as well as communicating the IP addresses of other key network services such as name servers, mailhosts, and gateways that are available. Once setup and enabled, this mechanism allows nodes to be added to the network without the intervention of a network administrator.

Ease of installation and configuration is therefore achieved through the use of DHCP by the fact that most local networks are configured to allow network devices to be added without the intervention of an administrator using DHCP. In addition, most local networks allow web access through their firewall (e.g., gateway firewalls 30 and 70). These two factors allow both the print job source 10 and the polling device 100 to connect and communicate to the spooling server 50 without the intervention of a network administrator. The user simply plugs in the polling device 100 and it accesses the network and starts polling the spooling server 50.

The invention may also be implemented using a virtual private network (VPN). A VPN is a mechanism that allows network nodes not directly connected to a local private network to behave as if they are locally connected to the network by forwarding the data packets through some type of public or intermediate network. For security, authentication of the node desiring to connect to the network is performed, as well as encryption of the contents of the forwarded packets. Various commercial products allow the setup and configuration of VPN's through various connectivity mechanisms such as dial-up ISP's, Cable Modems, and DSL on the client node end. The local network that is being connected to will require a router or router/firewall that implements the VPN protocol to allow the VPN connection. A VPN is made up of two components: L2TP (Layer 2 tunneling protocol) and IPSEC (Internet Protocol Security).

In a preferred embodiment, the polling device 100 is capable of communicating the status of the printer 120 to the spooling server 50. The printer status may comprise at least one of a printer ready indication, an on-line indication, toner level information, paper supply information, error information, or other appropriate status information.

A printer operator can be notified when the printer status indicates that the printer 120 requires attention. The operator can also be provided with vendor contact information to facilitate obtaining printer supplies or service. Automatic on-line ordering of printer supplies as required by printer status can be provided (e.g., by the spooling sever 50 contacting predetermined preferred vendors).

The print job may include at least one of a document, a poster, an image, a coupon, a ticket, a certificate, a check, a list, a schedule, a periodical, a unit of currency, a negotiable instrument, postage, a bill of lading, a lottery or gaming ticket, a token, food stamps, a license, a permit, a pass, a passport, a ballot, a citation, identification, a copy-protection key, a proof-of-purchase, a warranty, a receipt, a transcript, a library card, or any other printable subject matter.

Figure 6:
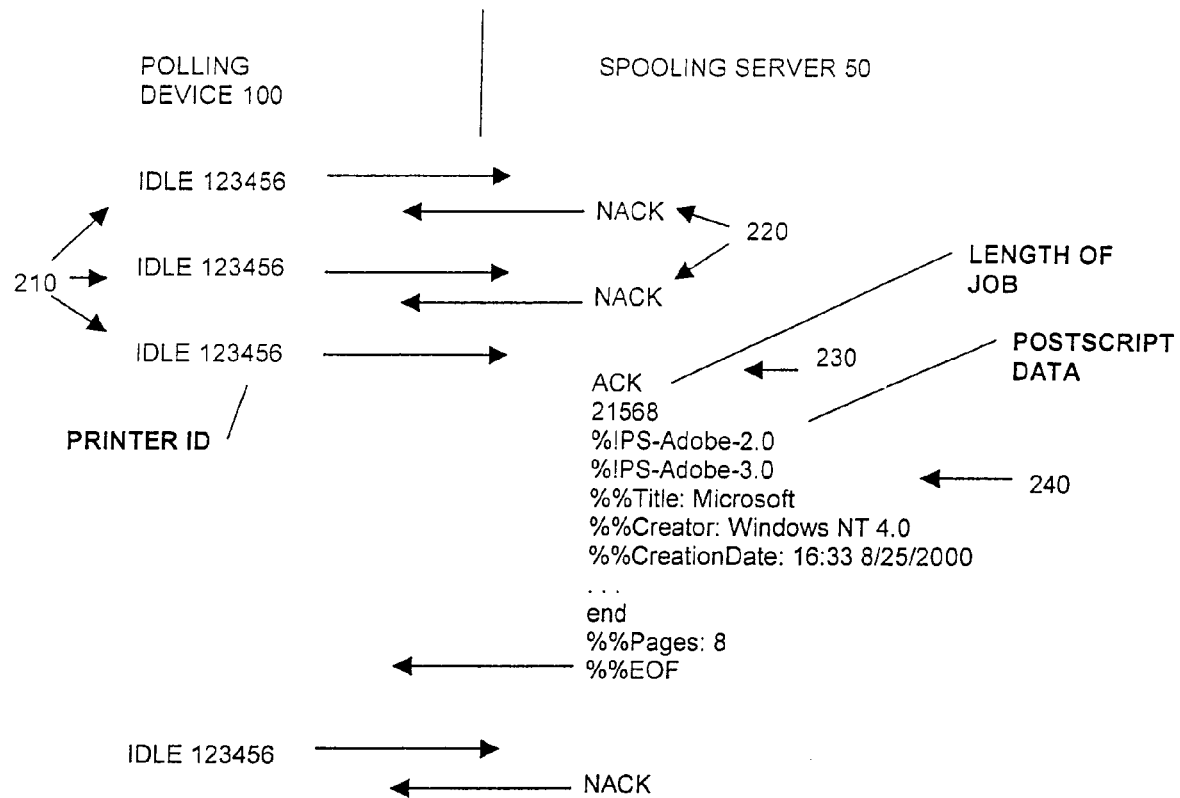
FIG. 6 shows an example of communications which take place between various components of the invention.

As illustrated in FIG. 6, the polling device 100 may periodically poll the spooling server 50. The interval of the polling can vary as desired and can be adjusted dynamically based upon such factors as traffic or requests for files. The polling request (query) 210 is preferably encrypted. Because the query 210 is directed to a specific spooling server 50, it is difficult for a third party to breach the system's security. The query 210 asks the spooling server 50 if it has a print job identified by the user (e.g., via a PIN or a job number). Once the spooling server 50 has received a request 210 from the polling device 100 for a print job that is stored at the spooling server 50, the spooling server 50 waits for the next query 210 from the polling device 100. Then, instead of its normal answer to the query of "NACK" (negative acknowledge) 220, the spooling server 50 answers "ACK" (acknowledge) 230 and transmits the print job to the destination printer 120.

Figure 11:
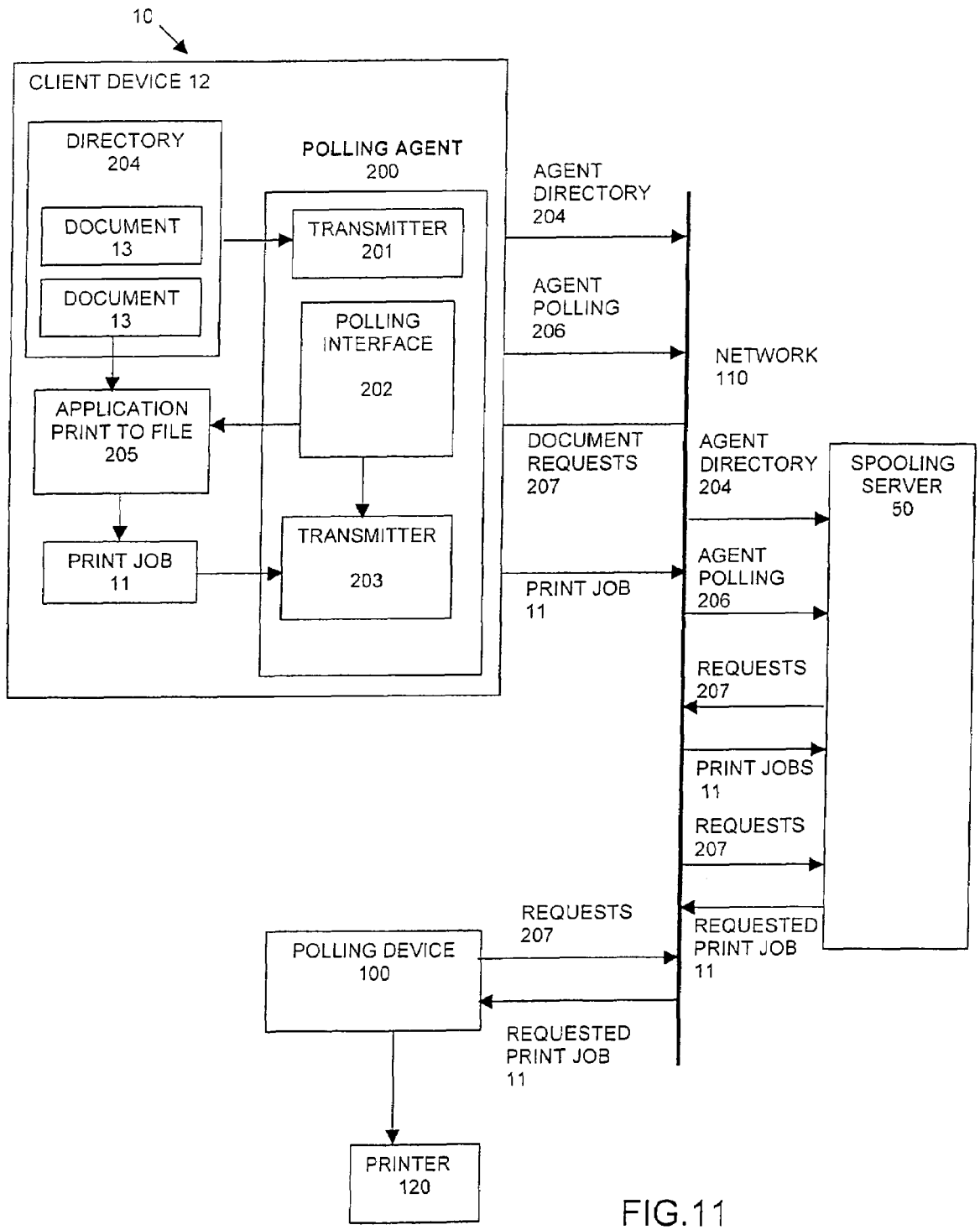
FIG. 11 is a block diagram of an example embodiment of an agent program.

In an alternate embodiment as shown in FIG. 11, an agent program 200 provides a directory of documents 204 to the spooling server 50. The agent program 200 enables a client device 12 associated with the print job source 10 to poll the spooling server 50 to determine whether the spooling server 50 requires a document 13 identified in the directory 204 to complete a print job. If so, the document 13 can be uploaded from the client device 12 to the spooling server 50. The agent 200 enables a user at a printer 120 (or using any of the available interfaces to the spooling server 50) to initiate the printing of documents 13 that still reside on a client device 12 (such as the user's computer) even though the documents 13 have not been forwarded to the spooling server 50 as print jobs.

The agent program 200 may be downloaded and installed on the client device 12. The agent program 200 may be configured to make the contents of some or all of the directories 204 on the client device 12 available to the spooling server 50. Once installed and running, the agent program 200 initiates a connection to the spooling server 50 in the same way the polling device 100 does. The agent program may have a connection through a firewall, for example.

The directory of documents 204 may include application files such as a Microsoft Word .doc file, for example, or files that have been made into a print job (Postscript or PDF file) by printing "to a file" from some application.

The directory 204 can be communicated to the polling device 100 and presented at the polling device 100. Selection of a print job 11 from the directory can be made (e.g., via a user interface).

For example, the spooling server 50 will list those documents 13 being available from the agent program 200 whenever the user of that account is interacting with the polling device 100, or any other interface provided for communication to the spooling server 50 as described herein.

For example, the agent program 200 may periodically poll the spooling server 50 via polling interface 202. The interval of the polling can vary as desired and can be adjusted dynamically based upon such factors as traffic or requests for files. The communications between the agent program 200 and the spooling server 50 occur substantially as described in connection with FIG. 6 above. The polling request (query) 206 is preferably encrypted. Because the query 206 is directed to a specific spooling server 50, it is difficult for a third party to breach the system's security. The query 206 asks the spooling server 50 if it wants any files in the directory 204 (and may also update the directory 204). Once the spooling server 50 has received a request 207 from the polling device 100 for a document that is listed in the directory 204, the spooling server 50 waits for the next query 206 from the agent program 200. Then, instead of its normal answer to the query of "NACK" (negative acknowledge), it answers "ACK" (acknowledge) followed by document information, such as the name of the document that is requested by request 207.

The agent program 200, upon receiving an "ACK" and the request information 207, opens the document 13 using the application it was created in and prints it to a temporary file 205 to create a print job 11. This print job 11 is then transmitted to the spooling server 50 via transmitter 203. The spooling server 50 uses its normal mechanism to then transmit the print job 11 to the destination printer 120.

Alternatively, the spooling server 50 may send an "ACK" followed by the name of a subdirectory. In that case, the agent program 200 returns the contents of that subdirectory. The spooling server 50 can then display those files to the user at the polling device 100 and allow one of the files to be selected, or allow additional navigation of directory 204 to take place.

The directory 204 may be presented via a visual presentation or an audio presentation. The client device 12 may periodically poll the spooling server 50 to determine whether the spooling server 50 requires a document from the directory 204 to complete a print job.

Communications with the spooling server 50 may be enabled via at least one of a telephone, a personal digital assistant device, a computer, an Internet appliance, a web browser, a dedicated terminal, or the like. The communications with the spooling server 50 may be via an audio interface or a visual interface.

A communication device for providing status of the print job stored on the spooling server 50 may be provided. The status of the print job may comprise at least one of filename, file size, author, creation date, print job lifetime, image, title, contents, personal identification number, recipient, job number, or reference number. The communication device may be a telephone, a computer, an Internet appliance, a personal digital assistant device, a dedicated terminal, or any other suitable wireless or wired communication device.

The print job source 10 may be one of a computer, a personal digital assistant device, an Internet appliance, a telephone, a facsimile machine, a scanner, a dedicated terminal, or other suitable source.

The polling device 100 may be capable of polling multiple spooling servers.

The spooling server 50 may be capable of communicating with other servers and receiving a print job from at least one of the other servers.

The print jobs submitted from the print job source 10 to the spooling server 50 may be generated in a page description language known as Postscript. Alternate choices for a page description language are PDF, Latex, or other similar languages. The size of the paper, various printer capabilities, and printable area dimensions may be assumed from a lowest common denominator set of capabilities common to most of the intended target printers.

Figure 7:
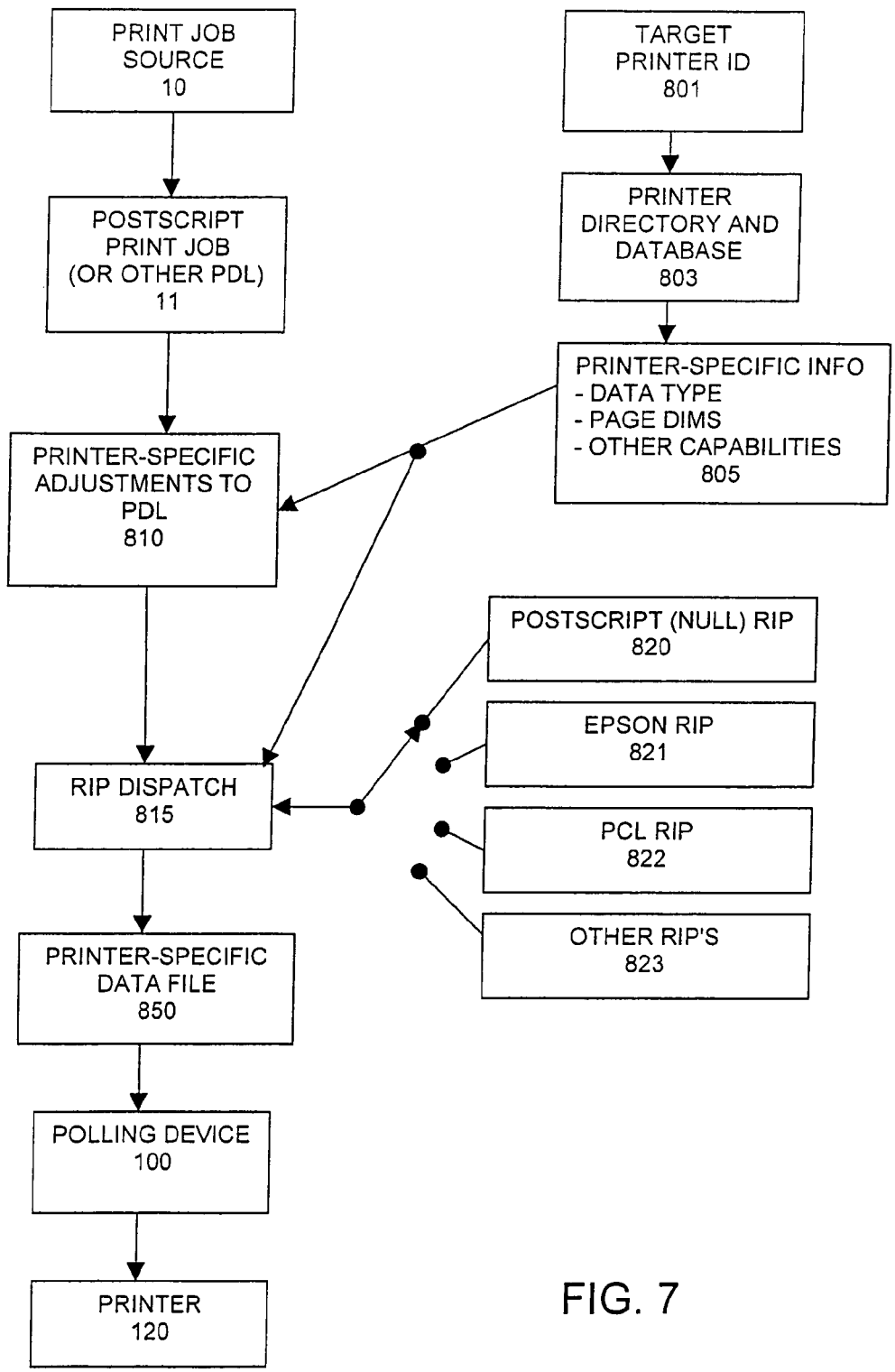
FIG. 7 is a flow chart illustrating an example print job reformatting routine.

Once the destination printer 120 is known, the page description language data needs to be converted into a form that can be understood by that printer 120. This process is shown in FIG. 7. Once the print job 11 is sent to the spooling server 50, a target printer 120 must be identified before the spooling server 50 can forward the print job 11 to be printed. Target printer identification 801 can be provided with the print job 11 from the print job source 10 or can be provided by the polling device 100 as part of the polling query. The spooling server 50 retrieves printer specific information 805 for the target printer 120 from a printer database 803. Based on the printer specific information 805 (such as data type, page dimensions, color capabilities, margins, and other print characteristics) the spooling server 50 will make printer specific adjustments 810 to the print job 11 at the page description language level prior to rasterization.

On printers that can accept Postscript (or the PDL of choice) directly, no modification is necessary. For other, simpler printers, a lower level bitmap form of the page is required to be sent to the printer. In this case, the page description language needs to be rasterized into a bitmap form. In addition, the bitmap data needs to be formatted into the form understood by the printer 120. A raster image processor 815 determines the target printer type from the printer specific information 805 and selects an appropriate data format from available formats 820, 821, 822, 823. The raster image processor 815 places the print job 11 into a printer specific data file 850 for delivery to the polling device 100 to be printed at the target printer 120.

One common example of a data format used with simple printers is PCL (Printer Control Language), which is widely used in printers built by Hewlett Packard. Other printers built by Epson, for example use Epson's proprietary Epson-escape code sequences to format the bitmap data.

Alternatively, reformatting of the print job may take place at the printer 120, at the polling device 100, or at any other suitable device.

Figure 8:
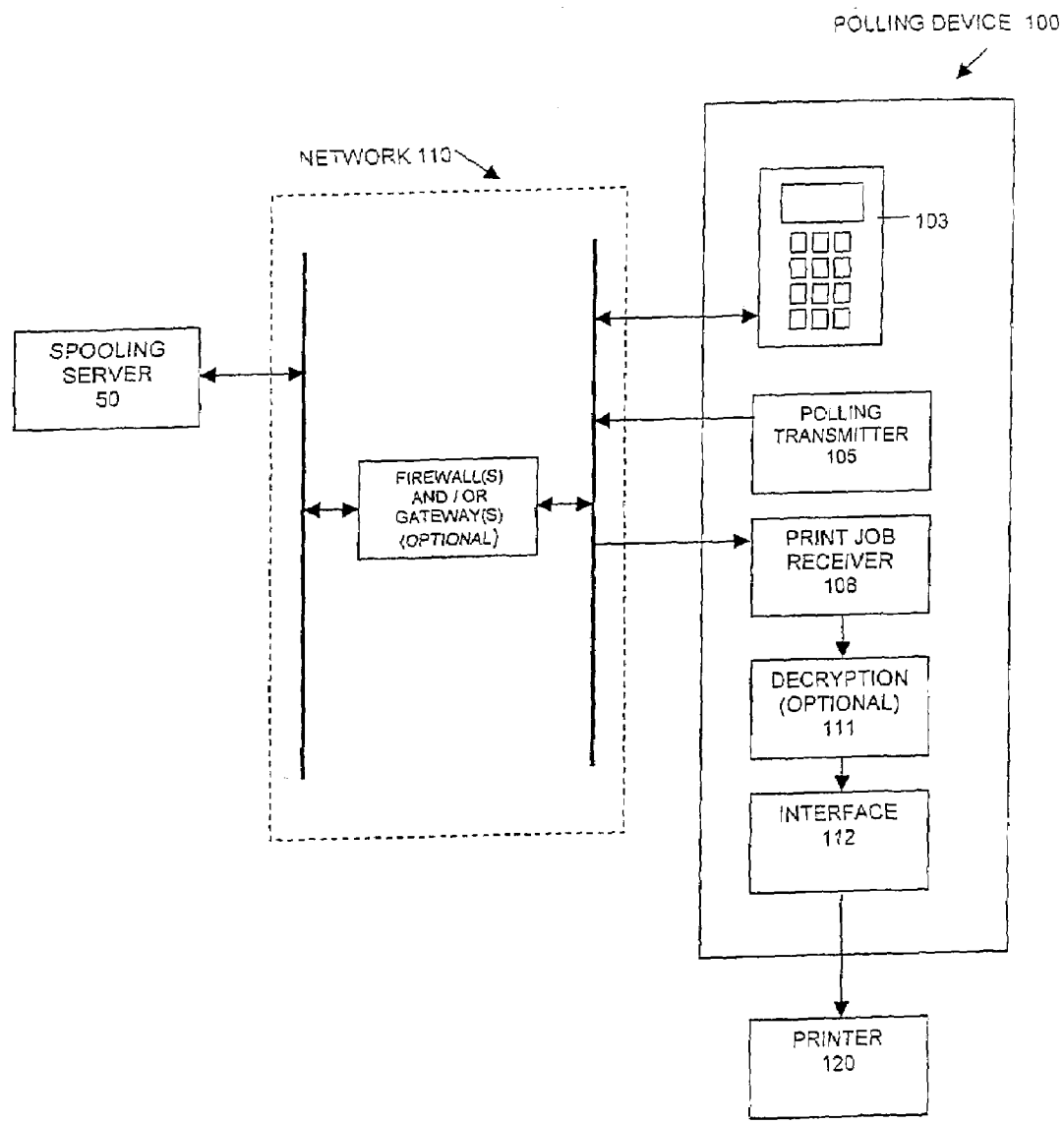
FIG. 8 is a block diagram of an example embodiment of a polling device.

FIG. 8 shows the components of an embodiment of a polling device 100. As discussed above in connection with FIG. 3, the polling device may optionally include a user interface 103 for enabling communications with the spooling server 50 (e.g., providing a PIN to the spooling server 50). A polling transmitter 105 is provided for transmitting polling requests to the spooling server 50 via the network 110 to identify a print job stored at the spooling server 50 (as discussed in connection with FIGS. 1 and 4 above). A receiver 108 is provided for receiving the identified print job from the spooling server 50 via the network 110. Decryption 111 of an encrypted print job may optionally be provided for at the polling device 100. An interface 112 enables the polling device 100 to forward the print job to a printer 120 for printing.

Figure 9:
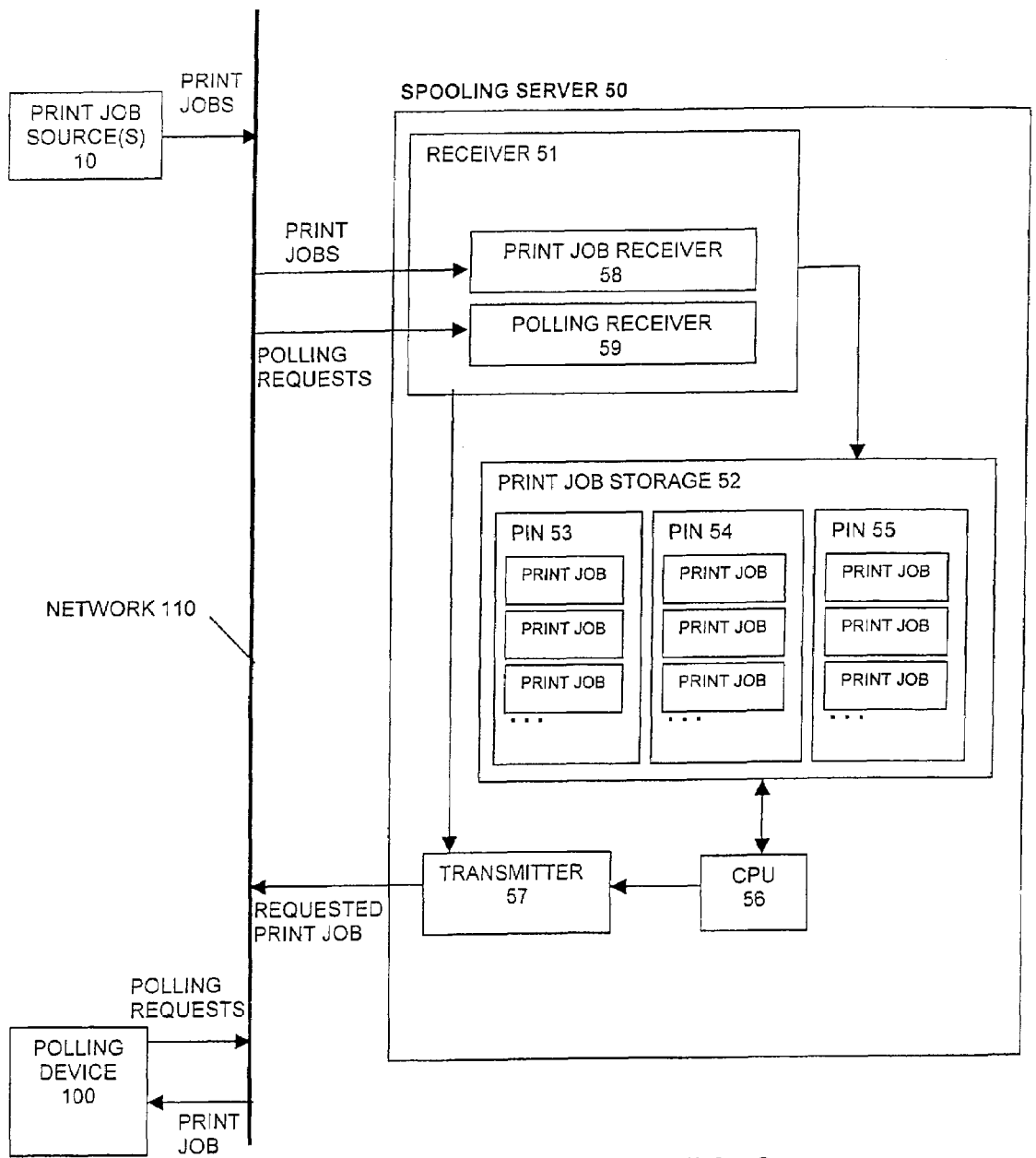
FIG. 9 is a block diagram of an example embodiment of a spooling server.

FIG. 9 shows the components of an embodiment of a spooling server 50. A receiver 51 is provided which is capable of receiving print jobs from the print job source 10 and receiving polling requests from the polling device 100. The receiver 51 may comprise a print job receiver 58 for receiving the print job and a polling receiver 59 for receiving the polling request. When a print job is received by the receiver 51, the spooling server 50 stores the print job in memory 52, which may comprise random access memory (RAM), magnetic or optical storage media, or any other read/write memory device. As discussed herein, the print jobs may be stored in memory 52 according to a PIN. Multiple print jobs may be stored under each PIN as shown at 53, 54, and 55. When the spooling server 50 receives a polling request for a specific print job from the polling device 100 at the receiver 51, the spooling server 50 will determine whether the requested print job is stored in memory 52, and if so, forward the requested print job to the polling device 100 via transmitter 57. A processor 56 enables the spooling server to search for, retrieve, and/or reformat the print job for delivery to the polling device 100.

Figure 10:
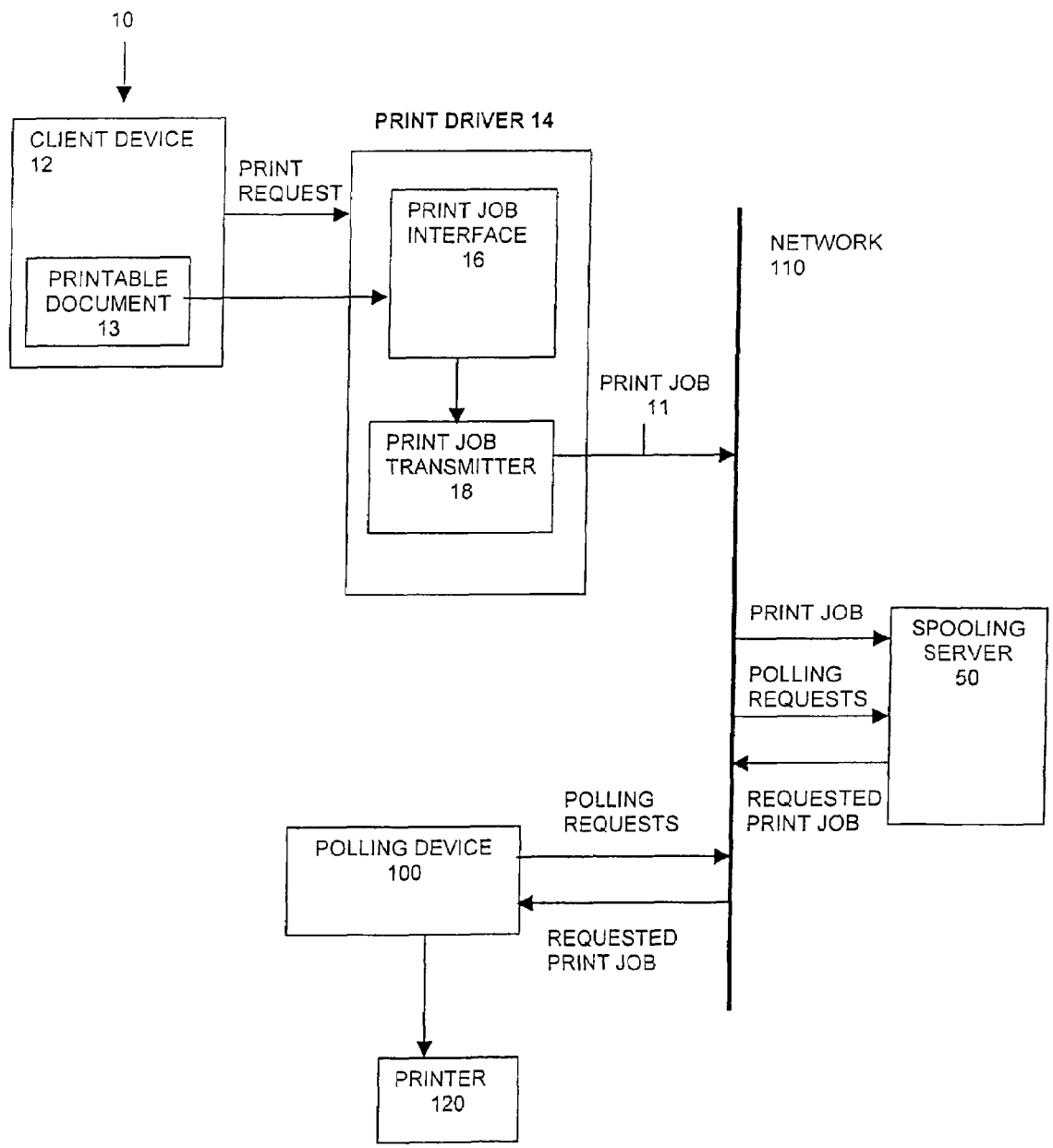
FIG. 10 is a block diagram of an embodiment of a print driver.

FIG. 10 shows the components of an embodiment of a print driver 14. An interface 16 is provided for receiving a print job from a print job source 10. The print job source 10 is shown in FIG. 10 as a client device 12, but can be any suitable print job source as discussed herein. The interface 16 receives a printable document 13 from the client device 12. A transmitter 18 is provided for transmitting the print job 11 to the spooling server 50 via the network 110. The spooling server 50 receives polling requests from the polling device 100 and forwards one or more identified print jobs to the polling device 100 in response to the polling requests. The print jobs can then be printed at a printer 120 associated with the polling device 100. As discussed in greater detail elsewhere herein, the polling device 100 does not have to identify specific print jobs to the spooling server 50. Instead, it can simply request a list of all print jobs (if any) currently stored at the spooling server 50 for that specific polling device 100, or for a particular PIN number (or other identifier) entered via the polling device 100 or other device. As discussed elsewhere herein, the list of print jobs may be accessed via various other devices capable of communicating with the spooling server 50.

Although the invention is described above in connection with the communication of a print job over a network to a printer using the described polling mechanisms, those skilled in the art will appreciate that the present invention may be used to facilitate the transfer of any type of information over a network from one client device to another, and in particular from one client device to a wide variety of document output devices, such as printers, fax machines, copiers, or multifunction machines which provide combined printing, faxing and/or copying functions.

Figure 12:
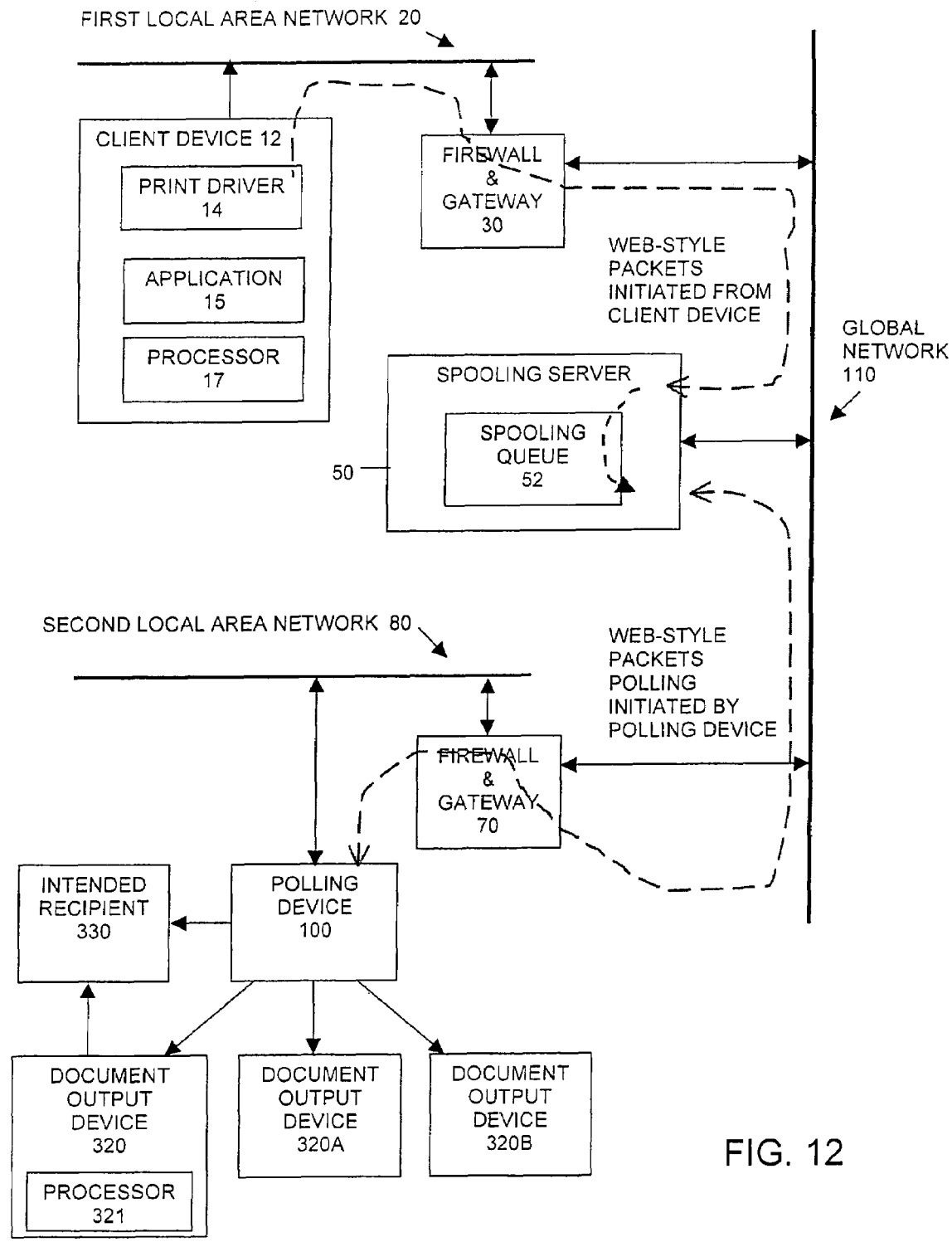
FIG. 12 is a block diagram of an example embodiment of the present invention related to the forwarding of control requests.

For example, the present invention also provides methods and apparatus for controlling or providing information to a document output device using the polling methods described above in connection with FIGS. 1-11. As shown in FIG. 12, a control request for controlling the document output device may be forwarded to a spooling server 50 from a client device 12 similar to the way in which a print job is forwarded as discussed above. The control request for controlling a designated document output device 320 is forwarded from a client device 12 to a server 50 via a network 110. The control request may be generated at a processor 17 of the client device 12 in response to user inputs. Alternatively, the control request may be automatically generated at the client device 12 by processor 17 and sent to the server 50 at predetermined intervals.

The control request is received (e.g., at receiver 51 shown in FIG. 9) and stored (e.g., in spooling queue 52) at the server 50 and communicated to the designated document output device 320 in response to a polling request received via the network 110 from a polling device 100 associated with the designated document output device 320. The receipt and storage of the control request at the server 50 is analogous to the receipt and storage of a print job as described above in connection with FIGS. 1-11. Once received, the control request may be carried out at the designated document output device 320.

As shown in FIG. 8, the polling device 100 may include a transmitter 105 for forwarding a polling request to the server 50 over the network 110 and a receiver 108 for receiving the control request from the server 50 at the polling device 100 in response to the polling request. The polling device 100 may also include an interface (e.g., interface 112) with the designated document output device 320 for communicating the control request to the designated document output device 320.

The document output device 320 may comprise at least one of a printer (e.g., printer 120 in FIG. 1), a copier, a facsimile machine, or the like. The document output device 320 may also be a multifunction machine with printing, faxing, and/or copying capabilities.

The control request may comprise a request for a status report from the designated document output device 320. The requested status report may be provided from the designated document output device 320 to the server 50 (e.g., via the polling device 100 or directly from the document output device 320). The status report may be generated, for example, at a processor 321 of the document output device 320 in response to the polling request. The status report may be stored at the server 50 in spooling queue 52. The status report may be downloaded from the server 50 via at least one of the client device 12, a telephone, a computer, an Internet appliance, a personal digital assistant, or any other device capable of communicating with the server 50 over the communication network 110.

The request for a status report may comprise at least one of a request for a count of pages copied, a request for a count of pages printed, a request for a toner level, a request for drum usage, a request for a paper supply level, a request for error information, a request for an on-line or off-line indication, a request for a device ready indication, a request for a paper jam indication, a request for a media mismatch indication, or any other status indication which may be obtained from the document output device 320.

The status report may also include vendor contact information to facilitate obtaining supplies or service for the designated document output device 320. Automatic on-line ordering of supplies for the designated document output device 320 may be provided for in response to the status report (e.g., via CPU 56 at the spooling server 50).

In an alternative example embodiment, the status report (or other information) may be communicated from the document output device 320 to an intended recipient 330 of the status report (rather than to an intervening server). The status report may be communicated to the intended recipient 330 from the document output device 320 directly or via the polling device 100. The intended recipient 330 may be the client device 12 that forwarded the control request initiating the status report, or a separate entity identified in the control request, for example a vendor which can provide supplies based on the information contained in the status report, or an entity that is leasing or servicing the copier.

In order to facilitate such direct forwarding of the status report from either the polling device 100 or the document output device 320 to the intended recipient 330 directly, the polling device 100 and/or the document output device 320 will need to include appropriate processing and transmitting functions as is known in the art. For example, the polling device 100 or the document output device 320 may be configured to communicate the status report to the intended recipient via an email, a page, or a voicemail.

In an alternate embodiment of the present invention, the control request may comprise a request to manipulate a software controlled function of the designated document output device 320 (e.g., via processor 321). For example, the software controlled function may comprise adjusting offsets, adjusting timings, raising temperature of fuser oil, adjusting imageable area, configuring installed media, or the like. Alternatively, the control request may comprise a firmware or software update for the designated document output device 320.

The polling request may be periodically forwarded from the polling device 100 to the server 50. For example, the polling request may be forwarded on an hourly, daily, or weekly basis. The period of the polling may be configured using a control request.

The network 110 may comprise at least one of a local area network, a wide area network, a global network, a telephone network, and the Internet. The polling device 100 may be located within a gateway firewall 70, while the server 50 may be located outside the gateway firewall 70. In such an embodiment, the control request may be forwarded to the server as web-style traffic and received at the polling device as web-style traffic. Ideally, the control request is forwarded by the server 50 to the polling device 100 such that reconfiguration of the gateway firewall is not required.

In a further example embodiment of the present invention, the client device 12 may be located at and in communication with a first local area network 20. The polling device 100 may be located at and in communication with a second local area network 80. The server may be located outside of the first and second local area networks 20 and 80. The client device 12 may communicate with the server 50 via a first gateway firewall 30 which controls access to the first local area network 20. The polling device 100 may communicate with the server 50 via a second gateway firewall 70 which controls access to the second local area network 80.

The polling device 100 may be one of (i) a stand-alone device connected to the document output device 320 via one of a USB port or a bi-directional parallel port, (ii) integrated into the firmware of the document output device 320, or (iii) integrated into the software of a local network server.

The polling device 100 may be provided with a unique identifier. The control request may be associated with a designated document output device 320 according to the unique identifier of the polling device 100. The control request may be stored at the server 50 in accordance with the unique identifier. The unique identifier of the polling device 100 may comprise one of a media access ID, an IP address, a telephone number, a serial number of the polling device 100, a serial number of the document output device 320 associated with the polling device 100, a vendor supplied identification, or the like.

The control request may be formulated at the client device 12 as a set of instructions or information for use at the document output device 320. This set of instructions or information may be encapsulated in a packet containing the unique identifier of the document output device 320. This packet may then be sent in a message with a message address corresponding to an address (e.g., an IP address) of the spooling server. Once received by the spooling server, the spooling server may store the packet according to the unique identifier. Once a polling request is received which corresponds to the unique identifier, the spooling server will create a message that includes the packet and has an address corresponding to an address of the polling device 100.

The client device 12 may comprise one of a telephone, a computer, an Internet appliance, a personal digital assistant device, or a dedicated terminal.

In an alternative example embodiment, the polling device 100 may be associated with more than one document output device 320. For example, the polling device 100 may be associated with a plurality of document output devices 320, 320A, and 320B in a local area network 80. In such an example embodiment, the polling device 100 may poll the server for any control requests stored thereat for any of the document output devices 320, 320A, and 320B in the local area network 80, each of which may have a unique identifier as discussed above. The polling device 100 may then receive the control requests from the server 50 and route them to the appropriate document output device 320, 320A, and 320B according to the unique identifier.

Those skilled in the art will appreciate that many of the features of the present invention described above in connection with FIGS. 1-11 for the forwarding of a print job are equally applicable to the embodiments of the invention described above in connection with FIG. 12 for the forwarding of a control request (and vice versa).

Further, the features of the embodiments of FIGS. 1-11 and the features of the embodiments of FIG. 12 may be combined. For example, a print job may be forwarded together with a control request. For example, sending a control request together with a print job may be desirable where the user at the print job source wants to control the type of document output from the printer, such as designating the print quality (e.g., draft, medium, or best quality), designating the paper feed (e.g., to select paper size, letterhead, envelope, etc.), designating black and white printing or color printing, or the like. Alternatively, the control request may be unrelated to the print job being sent. For example, the print job may be sent with a control request that requests a status report in the event that the print job is being sent within a time period for requesting such a status report.

It will now be appreciated that the present invention provides improved methods and apparatus for requesting and receiving information, such as print jobs, control requests, and status reports over a communications network in a secure manner without the need to specify the print destination. By using a polling device, the disadvantages of prior art push data flow techniques are overcome. Instead of having a server initiate contact with a print station behind a firewall, the present invention provides a polling device that polls a spooling server to determine if there is any information stored thereat for a particular document output device associated with the polling device. Compatibility with all types of document output devices is also provided.

Although the invention has been described in connection with preferred embodiments thereof, those skilled in the art will appreciate that numerous adaptations and modifications may be made thereto without departing from the spirit and scope of the invention, as set forth in the following claims.

What is claimed is:

1. A method for controlling a document output device, the method comprising the steps of:
    receiving a control request at a server for controlling a designated document output device, the server comprising any of a trusted or secure server, the control request sent from a client device to the server via a network;
    storing the control request at the server;
    receiving a polling request at the server, the polling request sent from a polling device associated with the designated document output device to the server via the network;
    communicating the control request from the server to any of the designated document output device or the polling device associated with the designated document output device in response the received polling request; and
    performing the communicated control request at the designated document output device.

2. A method in accordance with claim 1, wherein:
    the document output device comprises at least one of a printer, a copier, or a facsimile machine.

3. A method in accordance with claim 1, wherein:
    the control request comprises a request for a status report from the designated document output device; and
    the requested status report is provided from the designated document output device to the server.

4. A method in accordance with claim 1, wherein:
    the control request comprises a request to manipulate a software controlled function of the designated document output device.

5. A method in accordance with claim 1, wherein:
the polling request is periodically forwarded from the polling device to the server.

6. A method in accordance with claim 1, wherein:
the network comprises at least one of a local area network, a wide area network, a global network, a telephone network, and the Internet.

7. A method in accordance with claim 1, wherein:
the client device may comprise one of a telephone, a computer, an Internet appliance, a personal digital assistant device, or a dedicated terminal.

8. A method for controlling a document output device, comprising the steps of:
forwarding a control request for controlling a designated document output device from a client device to a server via a network;
storing the control request at the server;
communicating the control request to the designated document output device in response to a polling request received via the network from a polling device associated with the designated document output device, wherein the polling device is one of (i) a stand-alone device connected to the document output device via one of a USB port or a bi-directional parallel port, (ii) integrated into the firmware of the document output device, or (iii) integrated into the software of a local network server; and
performing the control request at the designated document output device.

9. A method in accordance with claim 8, wherein the control request comprises a request for a status report from the designated document output device, wherein the requested status report is provided from the designated document output device to the server, and wherein the method further comprises the step of:
downloading the status report from the server via at least one of the client device, a telephone, a computer, an Internet appliance, or a personal digital assistant.

10. A method in accordance with claim 8, wherein the control request comprises a request for a status report from the designated document output device, wherein the requested status report is provided from the designated document output device to the server, and wherein the request for a status report comprises at least one of a request for a count of pages copied, a request for a count of pages printed, a request for a toner level, a request for drum usage, a request for a paper supply level, a request for error information, a request for an on-line or off-line indication, a request for a device ready indication, a request for a paper jam indication, or a request for a media mismatch indication.

11. A method in accordance with claim 8, wherein the control request comprises a request to manipulate a software controlled function of the designated document output device, wherein the software controlled function comprises one of adjusting offsets, adjusting timings, raising temperature of fuser oil, adjusting imageable area, or configuring installed media.

12. A method in accordance with claim 8, wherein:
the control request comprises a firmware update for the designated document output device.

13. A method in accordance with claim 8, wherein:
the polling device is located within a gateway firewall; and
the server is located outside the gateway firewall.

14. A method in accordance with claim 8, wherein:
the client device is located at and in communication with a first local area network;
the polling device is located at and in communication with a second local area network; and
the server is located outside of the first and second local area networks.

15. A method in accordance with claim 8, further comprising the steps of:
providing the polling device with a unique identifier; and
associating the control request with a designated document output device according to the unique identifier of the polling device;
wherein the control request is stored at the server in accordance with the unique identifier.

16. A method in accordance with claim 8, wherein:
the polling device is associated with more than one document output device.

17. A method in accordance with claim 10, wherein:
the status report includes vendor contact information to facilitate obtaining supplies or service for the designated document output device.

18. A method in accordance with claim 10, further comprising the step of:
providing for automatic on-line ordering of supplies for the designated document output device in response to the status report.

19. A method in accordance with claim 13, wherein:
the control request is forwarded to the server as web-style traffic and received at the polling device as web-style traffic.

20. A method in accordance with claim 13, wherein:
the control request is forwarded by the server to the polling device such that reconfiguration of the gateway firewall is not required.

21. A method in accordance with claim 14, wherein:
the client device communicates with the server via a first gateway firewall that controls access to the first local area network; and
the polling device communicates with the server via a second gateway firewall that controls access to the second local area network.

22. A method in accordance with claim 15, wherein:
the unique identifier of the polling device comprises one of a media access ID, an IP address, a telephone number, a serial number of the polling device, a serial number of the document output device associated with the polling device, or a vendor supplied identification.

23. A polling device associated with a designated document output device for enabling control of the designated document output device, the polling device comprising:
a transmitter for forwarding a polling request to a server over a network to identify a control request stored at the server for the designated document output device, wherein the server comprises any of a trusted or secure server;
a receiver for receiving the control request from the server at the polling device in response to the polling request; and
an interface with the designated document output device for communicating the control request to the designated document output device for performance of the received control request.

24. A polling device in accordance with claim 23, wherein:
the document output device comprises at least one of a printer, a copier, or a facsimile machine.

25. A polling device in accordance with claim 23, wherein:
the control request comprises a request for a status report from the designated document output device; and the requested status report is provided from the designated document output device to the server.

26. A polling device in accordance with claim 23, wherein: the control request comprises a request to manipulate a software controlled function of the designated document output device.

27. A polling device in accordance with claim 23, wherein: the polling request is periodically forwarded from the polling device to the server.

28. A polling device in accordance with claim 23, wherein: the network comprises at least one of a local area network, a wide area network, a global network, a telephone network, and the Internet.

29. A polling device in accordance with claim 23, wherein: the server receives the control request from a client device via the network.

30. A polling device in accordance with claim 23, wherein: the server receives the control request from a client device via the network; and
the client device may comprise one of a telephone, a computer, an Internet appliance, a personal digital assistant device, or a dedicated terminal.

31. A polling device associated with a designated document output device for enabling control of the designated document output device, the polling device comprising:
a transmitter for forwarding a polling request to a server over a network to identify a control request stored at the server for the designated document output device;
a receiver for receiving the control request from the server at the polling device in response to the polling request; and
an interface with the designated document output device for communicating the control request to the designated document output device for performance of the control request;
wherein the polling device is one of (i) a stand-alone device connected to the document output device via one of a USB port or a bi-directional parallel port, (ii) integrated into the firmware of the document output device, or (iii) integrated into the software of a local network server.

32. A polling device in accordance with claim 31, wherein the control request comprises a request for a status report from the designated document output device, wherein the requested status report is provided from the designated document output device to the server, and wherein the status report is downloaded from the server via at least one of a client device that forwarded the control request to the server, a telephone, a computer, an Internet appliance, or a personal digital assistant.

33. A polling device in accordance with claim 31, wherein the control request comprises a request for a status report from the designated document output device, wherein the requested status report is provided from the designated document output device to the server, and wherein the request for a status report comprises at least one of a request for a count of pages copied, a request for a count of pages printed, a request for a toner level, a request for drum usage, a request for a paper supply level, a request for error information, a request for an on-line or off-line indication, a request for a device ready indication, a request for a paper jam indication, or a request for a media mismatch indication.

34. A polling device in accordance with claim 31, wherein the control request comprises a request to manipulate a software controlled function of the designated document output device, wherein the software controlled function comprises one of adjusting offsets, adjusting timings, raising temperature of fuser oil, adjusting imageable area, or configuring installed media.

35. A polling device in accordance with claim 31, wherein: the control request comprises a firmware update for the designated document output device.

36. A polling device in accordance with claim 31, wherein: the polling device is located within a gateway firewall; and the server is located outside the gateway firewall.

37. A polling device in accordance with claim 31, wherein: the server receives the control request from a client device via the network;
the client device is located at and in communication with a first local area network;
the polling device is located at and in communication with a second local area network; and
the server is located outside of the first and second local area networks.

38. A polling device in accordance with claim 31, wherein: the polling device is provided with a unique identifier;
the control request is associated with a designated document output device according to the unique identifier of the polling device; and
the control request is stored at the server in accordance with the unique identifier.

39. A polling device in accordance with claim 31, wherein: the polling device is associated with more than one document output device.

40. A polling device in accordance with claim 33, wherein: the status report includes vendor contact information to facilitate obtaining supplies or service for the designated document output device.

41. A polling device in accordance with claim 33, wherein: automatic on-line ordering of supplies for the designated document output device is provided in response to the status report.

42. A polling device in accordance with claim 36, wherein: the control request is forwarded to the server as web-style traffic and received at the polling device as web-style traffic.

43. A polling device in accordance with claim 36, wherein: the control request is forwarded by the server to the polling device such that reconfiguration of the gateway firewall is not required.

44. A polling device in accordance with claim 37, wherein: the client device communicates with the server via a first gateway firewall that controls access to the first local area network; and
the polling device communicates with the server via a second gateway firewall that controls access to the second local area network.

45. A polling device in accordance with claim 38, wherein: the unique identifier of the polling device comprises one of a media access ID, an IP address, a telephone number, a serial number of the polling device, a serial number of the document output device associated with the polling device, or a vendor supplied identification.

* * * * *